US006545690B1

(12) United States Patent
Hernandez, III

(10) Patent No.: US 6,545,690 B1
(45) Date of Patent: Apr. 8, 2003

(54) LIAISON INTERFACE

(75) Inventor: Gaspar Hernandez, III, Andover, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/407,876

(22) Filed: Sep. 29, 1999

(51) Int. Cl.[7] ................................................ G09G 5/00
(52) U.S. Cl. ........................ 345/762; 345/764; 345/778; 345/765; 345/864
(58) Field of Search ................................. 345/700, 762, 345/866, 864, 778, 766, 764; 709/328

(56) References Cited

U.S. PATENT DOCUMENTS 5,265,201 A * 11/1993 Cabot et al. ................ 345/163
5,495,567 A * 2/1996 Iizawa et al. ............... 345/161
5,627,977 A * 5/1997 Hickey et al. .............. 346/733
5,673,401 A * 9/1997 Volk et al. .................. 345/327

* cited by examiner

Primary Examiner—Kristine Kincaid
Assistant Examiner—Mylinh Tran
(74) Attorney, Agent, or Firm—Harness, Dickey & Pierce, P.L.C.

(57) ABSTRACT

For a large system having an associated monitoring system with one or more user interfaces that each requires a large amount of direct user interaction, a liaison interface is provided between the user and the existing user interfaces. The liaison interface requires much less direct user interaction by taking the place of the user in the extensive direct interaction required by the existing user interfaces.

14 Claims, 3 Drawing Sheets

LIAISON INTERFACE

FIELD OF THE INVENTION

The invention is directed toward a technology for providing a liaison interface between a user and an existing user interface, and more particularly to such a liaison interface where the existing user interface normally requires an extensive amount of direct user interaction, and where the liaison interface isolates the user from the existing user interface by taking the place of the user in the extensive direct interaction with the existing user interface in order to reduce the amount of direct interaction required of the user.

BACKGROUND OF THE INVENTION

Large systems often include monitoring systems that permit one or more users to monitor the performance of the system in general, and to specifically monitor the state of one or more parameters of the large system. In some instances, the manner in which the monitoring system delivers information to the user can be a burden.

An example of the large system discussed above is a wireless communication network. Lucent Technologies Inc. has developed a monitoring system that a user can use to change parameters of the large system as well as to extract data about the large system. This monitoring system can generate the TIpdunix (TI) interface, the Status Display Page (SDP) interface and/or the AUTOPLEX Recent Change & Verification Database (APXRCV) interface. These interfaces can be used individually. But typically, information extracted from one of the interfaces is used to make a decision to use a second one of the interfaces in one way or another. To use an interface, a user must start a discrete process. In a windows-based environment, each interface session has its own window.

These discrete or non-integrated interfaces to the monitoring systems pose problems for the user. Each interface has its own set of commands as well as formats for returning information to the user. These command sets and display formats are extensive. This burdens the user's memory. Moreover, the SDP interface returns information in a manner that requires the user to interpret a combination of the foreground and background colors, as well as whether the associated text is blinking or not, in a particular region of the screen in order to determine the state of a system component of a large system.

Based upon the information extracted from a first interface, the user must make a decision about whether it is appropriate to use a second interface and if so, the user must appropriately form the command to be submitted. Often, the first interface is used merely to verify that the large system is operating correctly. The user must inspect the data returned by the first interface to confirm that it is consistent with normal operation of the large system. If there is some discrepancy, it must be recognized by the user. Then, the user must determine the problem that is indicated by the discrepancy. Then, the user must take appropriate action, typically via one of the other interfaces.

While the user has the responsibility of confirming via one of the interfaces that the operation of the large system is normal, the user is essentially a prisoner to that interface. The user must continually confirm that the operation of the large system is normal by repeatedly extracting data from the large system. If the user fails to recognize a discrepancy in the data that is returned, then the user will have failed to recognize that there is a problem for which action must be taken.

In another instance, the user might use one of the interfaces to change a parameter in the large system. To confirm that the parameter change has taken effect, the user typically has to use a second interface. But there is typically a delay between the requested change of parameter and the time at which it takes effect in the large system. To confirm that the change has taken effect, the user must repeatedly extract information from the large system via the second interface. Again, the user becomes a prisoner of the second interface until the user recognizes something in the data returned by the second interface that indicates the desired change has taken place.

Again, the TI, SDP and APXRCV interfaces each require a great deal of direct user interaction. An example of this is depicted in the unified modeling diagram of FIG. 1. FIG. 1 depicts interactions between a user 101 and a monitoring system 304 (to be discussed in more detail below concerning FIG. 3). Communication from the user originates from a line 102, while communications from the monitoring system 304 originate from a line 104. The monitoring system 304 can generate the TI, SDP and/or APXRCV interfaces discussed above.

In the unified modeling diagram of FIG. 1, a user desires the result of executing an inventory command via the TI interface. To do so, the user might have to manipulate a field in the APX database in order to enable the use of an inventory command of the TI interface. First, the user must initiate an interface session with the APXRCV interface.

Then, the user must make a backup copy of the APXRCV database for the cell in consideration. Making the backup copy represents the first action requested by the user and it is requested via the APXRCV interface, i.e., the first interface. This is a prudent step to prevent unwanted changes to the database. Then, the user must request data from a particular field within the database. This represents the first data request by the user. Again, it is requested via the first interface. This also requires the user to remember the relevant command and its arguments. Then, the user must wait to find out if the data request is successful or if it failed.

If the first data request is successful, then the user must evaluate the data returned from the field in the database and determine whether it is necessary to modify that data so that the later TI command will be enabled. If the content of the field in the database must be altered, then the user must remember the relevant command and its arguments as well as construct and submit the command. In other words, the user must request a second action, again, via the APXRCV interface. Once the particular field in the database stores the desired value, the user must initiate a TI session. Then, the user must determine whether the TI session has been successfully established. If not, then the user must restore the APXRCV database to its original values. Otherwise, the user must remember the desired TI command and its arguments. In other words, the user must request a third action, but this time it is requested via a second interface (the TI interface). Then the user should terminate the TI session. Then the user should restore the previous values of the APXRCV database, i.e., request a fourth action, again, via the first interface.

Again, FIG. 1 depicts the interaction between the user 101 and monitoring system 304 in the example discussed above. At item 105, after the user has initiated the APXRCV interface session, the user must remember the format of the desired command. At item 106, the user constructs and submits this command, i.e., requests the first action via the first interface. It is to be recalled that this corresponds to backing up the APXRCV database for the cell under consideration.

At item 107, the user must remember the format of the command needed to extract the value of a field within the particular database. At item 108, the user constructs and then submits the desired command, i.e., requests the first data via the first interface. At item 109, the APXRCV interface returns the first data. At item 110, the user must analyze the first data and decide whether or not that field in the database must be modified.

Assuming that the field in the database must be modified, at item 111, the user must remember the format for the desired command. At item 112, the user must construct and submit the desired command, i.e., the user must request the second action via the first interface. Then, at item 114, the user must determine if the change to the APXRCV database field was successful. If so, then the user must initiate a TI interface session. Then, the user must remember the format of the desired TI interface command at item 116. At item 118, the user must construct and submit the desired TI command, i.e., must submit the third request for action via the second interface. Then, the user must remember the format for the command to be used to restore the previous values of the APXRCV database for the cell under consideration. At item 120, the user must construct and submit the fourth request for action (this restore command) via the first interface (the APXRCV interface).

FIG. 1 depicts thirteen (13) of the more important instances involving direct interaction between the user and the monitoring system 304. This is excessive. The invention, in part, is a recognition that it is a problem that some interfaces to mature systems require a great deal of user interaction. A way to eliminate this excessive interaction is to redesign these interfaces so that they are more user friendly, i.e., require less direct user interaction. But this is prohibitively expensive. Typically, the large systems and the associated monitoring systems are mature products for which research and development efforts have been greatly diminished or curtailed entirely. Moreover, the burden and inconvenience to the user of these interfaces, i.e., the opportunity costs of the user, even when multiplied by the great many users involved, is still significantly outweighed by the costs associated with redesigning the interfaces.

SUMMARY OF THE INVENTION

The invention is, in part, a recognition that the amount of direct user interaction with the monitoring systems can be greatly reduced by providing a liaison interface between the user and at least a first interface. For example, such a liaison interface can be retrofit between a user and an existing interface. This solves the excessive direct user interaction problems suffered by the known interfaces while avoiding the great costs associated with revising the interfaces per se. The liaison interface automatically interacts with the existing interfaces, i.e., the liaison interface interacts with the existing interfaces without the direct involvement of the human user.

The invention, at least in part, is embodied by providing an arrangement of interfaces to a system, the arrangement of interfaces comprising: a first interface to said system, said first interface requiring direct user interaction in order for said user to communicate a first amount of information with said system; and a second interface to said system, said second interface requiring less direct user interaction than said first interface to communicate said first amount of information with said system. Such a second interface communicates said first amount of information with said user in a different manner than said first interface, and said second interface communicates said first amount of information with said system by emulating said first interface so as to at least reduce, if not eliminate, any need for the user to directly interact with said first interface.

The invention is also embodied, at least in part, by providing (for a machine directly connected to a system, said system having a first interface that requires direct user interaction in order for the user to produce a desired result from said system) a method (and software to cause a computer) to generate a second interface to said system, said second interface requiring less direct user interaction than said first interface to produce said desired result from said system. Such a method comprises: receiving a request for said desired result from said user; emulating said first interface to communicate a first amount of information with said system to achieve said desired result from said system; and generating a second interface that communicates a second amount of information with said user, where said second amount of information represents said desired result, said second amount of information is less than said first amount, and said second interface at least reduces, if not eliminates, any need for said user to directly interact with said first interface to produce said desired result.

The invention is also embodied, at least in part, by providing an integration apparatus to integrate interfaces to a system, said system having at least a first interface and a second interface, said first and second interfaces not being integrated together, said first interface requiring a large amount of direct user interaction to communicate a first amount of information between said user and said system. Such an apparatus comprises: a processor, directly connected to said system, to receive a high level request from said user to produce a result via interaction with said system, and to initiate a first session with said system by emulating said first interface to exchange said first amount of information with said system to achieve said result; and a device to communicate said result from said processor to said user, wherein said integration apparatus at least reduces, if not eliminates, any need for said user to directly interact with said first interface to produce said result.

Objectives, features and advantages of the invention will be more fully apparent from the following detailed description of the preferred embodiments, the appended claims and the accompanying drawings.

BRIEF DESCRIPTION OF THE DRAWINGS

The accompanying drawings are intended to depict example embodiments of the invention and should not be interpreted to limit the scope thereof

DETAILED DESCRIPTION OF THE PREFERRED EMBODIMENTS

Figure 3:
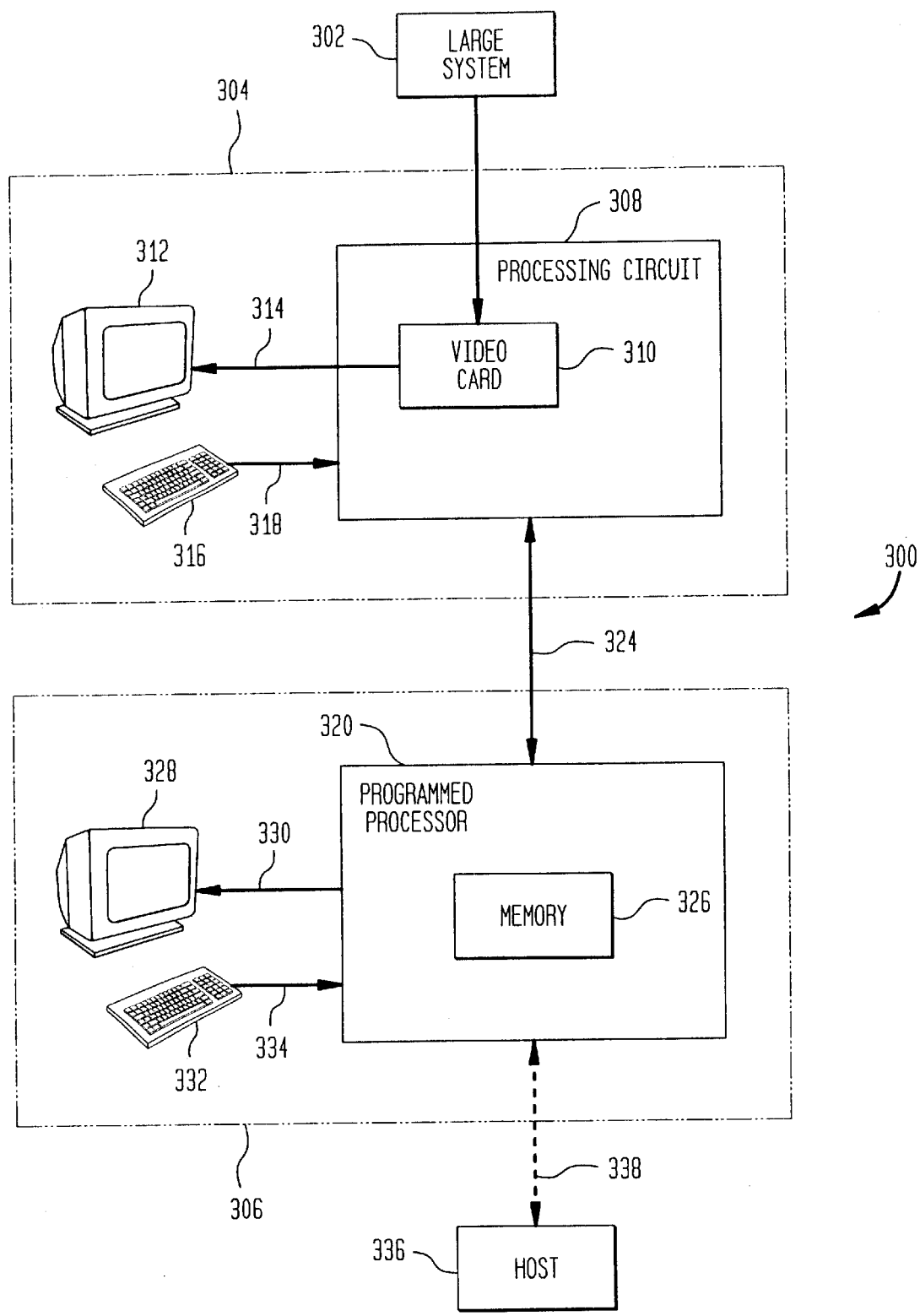
FIG. 3 depicts the system in which the device according to the invention forms a part.

FIG. 3 depicts an overall system 300 of which the liaison interface 306 according to the invention forms a part. The other parts of the overall system 300 are the large system 302 and the monitoring system 304, examples of each of which were discussed above in the Background Section. Again, an example of the large system 302 is a wireless telephony system and an example of the interfaces generated by the monitoring system 304 are the TIpdunix (TI) interface, the Status Display Page (SDP) interface and/or the AUTOPLEX Recent Change & Verification Data-Base (APXRCV) interface, all of which are marketed by Lucent Technologies Inc.

In more detail, the example of the large system discussed above is a wireless communication network that provides wireless communications service to a wireless unit that is situated within a geographic region. A Mobile Switching Center (MSC) is responsible for, among other things, establishing and maintaining calls between wireless units and calls between a wireless unit and a wireline unit. As such, the MSC interconnects the wireless units within its geographic region with a public switched telephone network (PSTN). The geographic area serviced by the MSC is divided into spatially distinct areas called "cells." In a schematic block diagram, each cell could be schematically represented by one hexagon in a honeycomb pattern. But, in practice, each cell has an irregular shape that depends on the topography of the terrain surrounding the cell. Typically, each cell contains a base station, which comprises the radios and antennas that the base station uses to communicate with the wireless units in that cell. The base stations also comprise the transmission equipment that the base station uses to communicate with the MSC in the geographic area via communication links. One cell site may sometimes provide coverage for several sectors. Here, cells and sectors are referred to interchangeably.

In a wireless cellular communications system, a base station and a wireless unit communicate voice and/or data over a forward link and a reverse link, wherein the forward link carries communication signals over at least one forward channel from the base station to the wireless unit and the reverse link carries communication signals on at least one reverse channel from the wireless unit to the base station. There are many different schemes for determining how wireless units and base stations communicate in a cellular communications system. For example, wireless communications links between the wireless units and the base stations can be defined according to different radio protocols, including time-division multiple access (TDMA), Frequency Division Multiple Access (FDMA), Code Division Multiple Access (CDMA) and others.

Within the geographic region, the MSC switches a call between base stations in real time as the wireless unit moves between cells, referred to as a handoff. Currently, in FDMA, TDMA, CDMA and GSM, cell site planning to determine the geographic coverage for a cell is a manually intensive task that needs constant adjustment. In planning a cell, the topology of the geographic area and a suitable antenna site is selected based on availability and zoning rules. Such a selection is typically not optimal but adequate. Drive tests and manually collecting signaling data are then performed mostly on the perimeter of the coverage area Transmit and receive antennas and power are then adjusted in a manually iterative manner to improve the call quality. Sometimes, frequencies are swapped with neighbor cells and/or transmit power is readjusted to improve the coverage. Over time, the cell site engineers review customer complaints and cell site dropped call reports and again try to manually optimize the RF performance.

The monitoring system 304 includes processing circuitry 308, a part of which is a video display driver circuit card 310. The video card 310 drives a video display device (VDD) 312. In the case of generating the SDP interface, the VDD 312 is driven with non-text, typically hexadecimal code, display-generation data supplied over a connection 314. An input device in the form of a keyboard 316 is connected to the processing circuitry 308 via a signal line 318.

The liaison interface 306 according to the invention includes a processor 320, an output device in the form of a video display device (VDD) 328 connected via a signal line 330, and an input device preferably in the form of a keyboard 332 connected via a signal line 334. The processor 320 has a memory 326 for storing a program or script that causes the processor 320 to generate the liaison interface 306 according to the invention. The processor 320 can communicate with, e.g., an input/output (I/O) port of the processing circuitry 308 via a bidirectional link 324.

An embodiment of the invention, for example, has been written in two languages, the Tool Command Language (TCL) and C. Of the portion of the code directed toward dealing with the SDP interface, about 10% is written in C to take advantage of the hexadecimal and bits translation capability of C.

The computer-readable memory 326 can include RAM, ROM, a fixed hard disk drive, and/or a removable storage medium for a non-fixed disk drive such as a floppy disk or a CDROM. The program which causes the processor 320 to generate the liaison interface 306 according to the invention can be downloaded to the processor 320 from the remote host 336 over the optional connection 338. As the program is downloaded through the optional connection 338, the computer-readable medium in which the program is embodied takes the form of a propagated signal.

Generation of the liaison interface according to the invention involves many sorting and comparison operations as well as accesses to look-up tables (LUTs). As such, the processor 320 should be of sufficient processing power to assure reasonably quick results. Examples of adequate processors are those from the Pentium family of processors marketed by Intel Inc.

Figure 2:
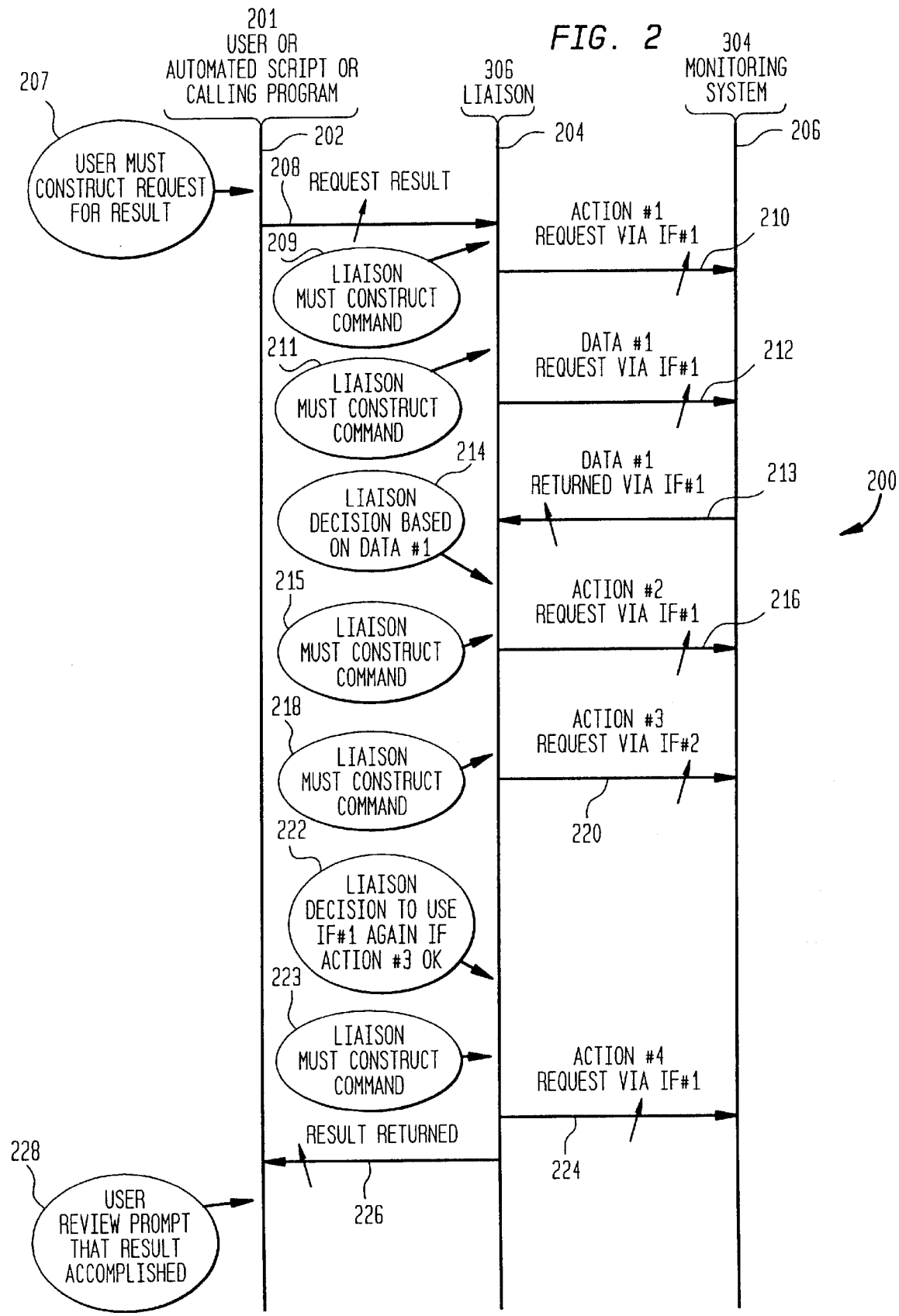
FIG. 2 is a unified modeling diagram for interactions between a liaison interface according to the invention and Background Art interfaces to a Background Art monitoring system as well as interactions between the liaison interface and a user.

FIG. 2 is a unified modeling diagram depicting an example of interactions by a liaison interface 306 according to the invention. In FIG. 2, communications from the liaison interface 306 originate from a line 204. The liaison 306 interacts with a user 201, be it a human user, a calling script user or calling program user. Communications from the user 201 originate from a line 202. The liaison interface 306 also interacts with the monitoring system 304. Communications from the monitoring system 304 emanate from a line 206. As will be discussed below, interposing the liaison interface 306 between the user and the monitoring system 304 greatly reduces the amount of direct interaction that the user must have with any interface.

Figure 1:
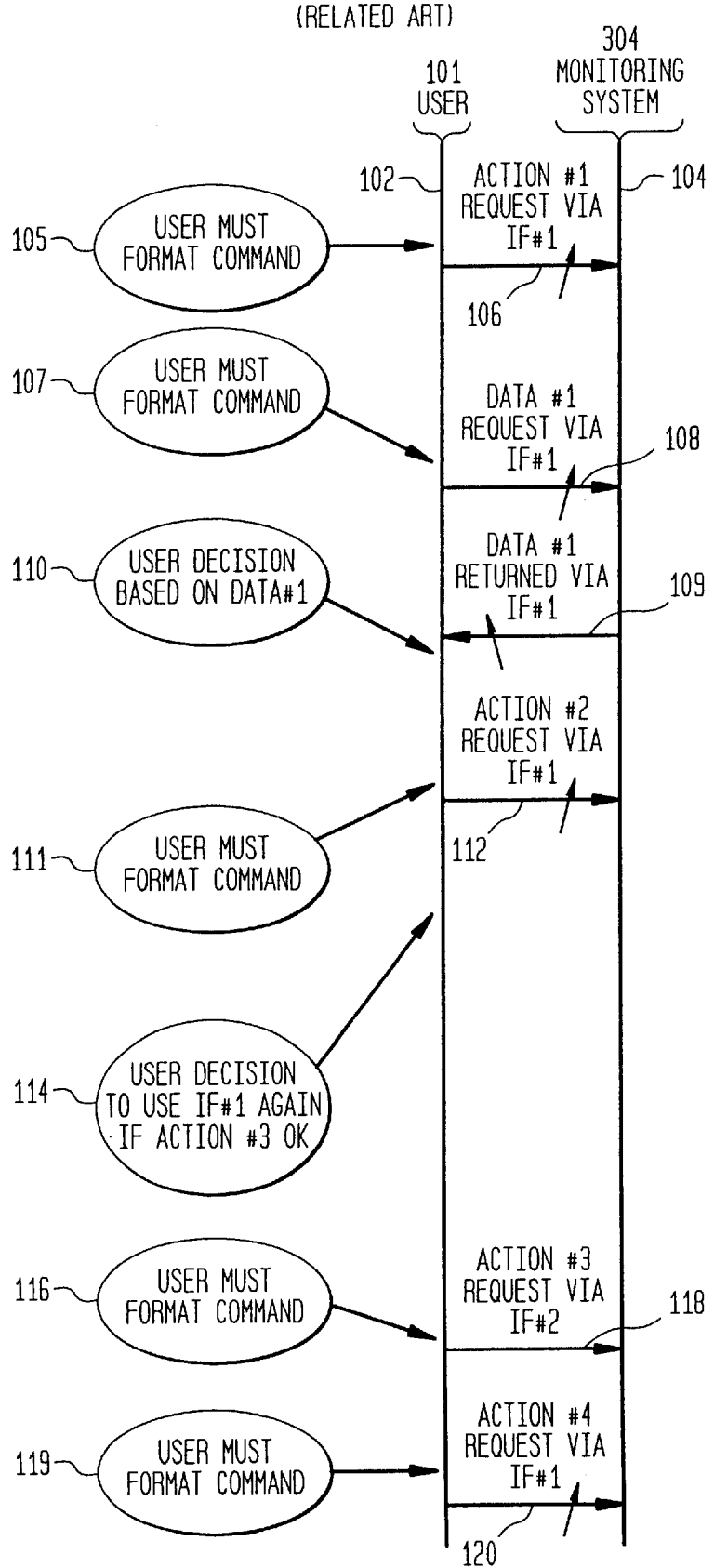
FIG. 1 is a unified modeling diagram for interactions between a human user and Background Art interfaces to a Background Art monitoring system.

FIG. 2 depicts interactions necessary to achieve the same result as in the example of FIG. 1. Again, the user 201 desires the result of executing an inventory command via the TI interface without having to be concerned with checking if certain parameters are in their required states. But in FIG. 2, only two interactions, namely 208 and 226, require direct interaction by the user. The other fourteen actions or interactions involve only the liaison 306 or the liaison 306 and the monitoring system 304, respectively. At Item 207, the user must construct a request for a result and submit it to the liaison interface 306 at element 208. The phrase "request a result" is intended to indicate that the user runs a script to produce the desired result by operation of the liaison interface 306. Such a script, the device for interpreting such a script and the scripting language itself will be discussed below.

After receiving a request for a result at Item 208 of FIG. 2, the liaison interface must construct the first of several commands needed to produce the desired result. Item 209 indicates where the first of these commands must be constructed by the liaison interface 306 (instead of by the user 201). This command requests a first action from a first interface (the APXRCV interface) at Item 210. This first action is a combination of initiating an interface session with the APXRCV interface as well as the submission of a command to make a backup copy of the database for a particular cell, e.g., cell2. At Item 211, the liaison interface 306 (instead of the user 201) must construct a second command. At Item 212, the second command is submitted as a request for first data from the first interface. As will be discussed below, this is a command to retrieve the value of a particular field in cell2.

At Item 213 of FIG. 2, the APXRCV interface returns the first data. At Item 214, the liaison interface 306 (instead of the user 201) makes a decision based upon the first data. As will be discussed below, this corresponds to making a logical test to determine the value of the data contained in the fields.

At Item 215 in FIG. 2, the liaison interface must construct a command based upon the decision at Item 214. At Item 216, this command is submitted as a second action a request via the first interface. As will be discussed below, this action is a command to change the value in a particular field under consideration. This change will enable the later use of a desired command (the inventory command) for another interface. The other interface is the TI interface. At Item 218, the liaison interface 306 (instead of the user 201) must construct the command for the TI interface. At Item 220, the command is submitted to the TI interface as a request for action #3.

At Item 222 of FIG. 2, the liaison interface 306 (instead of the user 201) must decide to use the first interface, i.e., here the APXRCV interface, if the third action was successful. At Item 223, the liaison interface 306 (instead of the user 201) constructs the next command for the first interface. At Item 224, a fourth action is submitted via this command to the first interface. At Item 226, the desired result is returned to the user.

The desired result can simply be a notification that the script has run successfully. Alternatively, the indication that the script has run successfully can be communicated in the form of a display of a desired parameter of the system. At Item 228, the user must review this prompt to confirm that the result was accomplished or to make use of the result.

An example of a script used to generate the liaison interface 306 that corresponds to the interactions depicted in FIG. 2 is listed below in Script #1.

SCRIPT #1

| LINE # | COMMAND |
|---|---|
| 01 | WAM:MSC 5 |
| 02 | WAM:CELL 49 |
| 03 | WAM:GETAPX cell2 BACKUP |
| 04 | IF:AFAIL |
| 05 | THENDO: |

-continued

SCRIPT #1

| LINE # | COMMAND |
|---|---|
| 06 | WAM:PRINT APXRCV cell2 form backup failed, script aborted. |
| 07 | WAM:ENDTEST |
| 08 | ELSEDO: |
| 09 | ENDIF: |
| 10 | WAM:GETAPXFLD cell2 f_list4.c_feat |
| 11 | IF:AFAIL |
| 12 | THENDO: |
| 13 | WAM:PRINT APXRCV cell2 field retrieval failed, script aborted. |
| 14 | WAM:ENDTEST |
| 15 | ELSEDO: |
| 16 | ENDIF: |
| 17 | IF:TEST_EXPR APXVAR EQ n |
| 18 | THENDO: |
| 19 | WAM:SETVAR APXVAR y |
| 20 | WAM:PUTAPXFLD cell2 f_list.c_feat[2] |
| 21 | IF:AFAIL |
| 22 | THENDO: |
| 23 | WALM:PRINT APXTCV field update failed, script aborted |
| 24 | WAM:ENDTEST |
| 25 | ELSEDO: |
| 26 | WAM:PRINT Inventory feature enabled |
| 27 | ENDIF: |
| 28 | ELSEDO: |
| 29 | ENDIF: |
| 30 | WAM:CONNECT TI |
| 31 | IF:LFAIL |
| 32 | THENDO: |
| 33 | WAM:PRINT TI login attempt failed, script aborted |
| 34 | WAM:PUTAPX cell2 BACKUP |
| 35 | WAM:ENDTEST |
| 36 | ELSEDO: |
| 37 | ENDIF: |
| 38 | TI:op:cell 49, inventory |
| 39 | WAM:DISCONNECT TI |
| 40 | WAM:PUTAPX cell2 BACKUP |
| 41 | WAM:ENDTEST |

Script #1 is written in the Wireless Automation Manager Interface Language (WAMIL). A brief discussion of the lines in the script will be presented.

In line 1 of Script #1, the Mobile Switching Center (NISC) variable is set to the value 5. In line 2, the cell variable, CELL, is set to the value 49. In line 3, the GETAPX command is recited, which makes a copy of the database corresponding to the APXRCV database named cell2 and names the copy as "backup." Line 3 of Script #1 corresponds to Item 210 of FIG. 2. Lines 4–9 are included in Script #1 to account for the possibility that there might be a failure in making a backup of the cell APXRCV database named cell #2 database. Lines 4–9 define an if-construct that tests for whether there has been a failure in making the backup copy. Line 5 indicates the commands to be executed if there is a failure, namely the commands in lines 6 and 7. Line 6 lists the print command to print a text string that notifies of the failure. Line 7 recites the command ENDTEST that terminates interpretation of the script. Line 8 indicates the commands to be interpreted if the tested condition is false, i.e., if the APXRCV database named cell #2 is backed up successfully. When the backup copy is made successfully, then the if-construct terminates at line 9 with the command "ENDIF."

At line 10, the command to retrieve the value of a field in the APXRCV database named cell2 is recited. This corresponds to Item #212 of FIG. 2. Lines 11–16 recite an if-construct that is similar to lines 4–9. But in lines 11–16, the error message to be printed refers to the failure to retrieve a field in the database rather than a failure to backup the entire database. Lines 17–29 recite a third if-construct.

The third if-construct of Script #1 corresponds to Item 214 and 216 of FIG. 2. At line 17, the value of the field retrieved in line 10 is tested. To reiterate, this corresponds to Item 214 of FIG. 2. The value of this field is tested to determine if it enables the use of a desired command from the TI interface. If the condition is true, namely, if the field value equals n, then the commands denoted by line 18 are interpreted. Line 19 recites a command to set the WAM interpreter (WAMI) variable APXVAR to the value y. Line 20 recites a command to put the value of APXVAR into the desired field in the APXRCV database named cell2. This corresponds to Item 2 of FIG. 2.

Line 21–24 correspond to lines 11–14, which account for the possibility that the requested change to the value in the database will not be made successfully. The text string recited in line 23 is a notification that the field update failed and that interpretation of the script has been terminated. Lines 25–26 correspond to the condition that the field in the database was changed successfully. Line 26 recites a command to print a text string that notifies of the successful field change.

In line 30 of Script #1, a TI session is initiated. Lines 31–37 correspond to an if-construct to account for the possibility that a TI interface session might not be successfully initiated. Line 33 recites the print command to print a text string that indicates that the TI interface session could not be established. Line 34 recites a command to restore the APXRCV database named cell #2 database to the values in the copy named BACKUP.

Line 38 of Script #1 recites the TI interface command to perform an inventory on cell #49. This corresponds to Item 220 of FIG. 2. Line 39 recites the command to terminate the TI interface session. Line 40 recites the command to restore the database for the APXRCV database named cell to the value stored in the copy named BACKUP. This corresponds to item 224 of FIG. 2. Lastly, the script terminates with line 41.

The WAMIL language includes commands and statements that are elements of if-constructs. A WAMIL command has the format of "interface:command," e.g., "TI:OP:CELL, GENERIC," "WAM:CONNECT SDP," or "WAM:GETSDP." In other words, a WAMIL command has a first field that identifies an interface and a second field that identifies a command. The first field actually identifies the interface in which the command of the second field is valid. Preferably, the first field precedes, or is a header for, the second field and is separated by an alphanumeric character such as a colon.

Details of the WAMIL language are contained in a first copending U.S. patent application, U.S. patent application Ser. No. 09/407,890, entitled "Wireless Automation Manager Interface Language (WAMIL)," by the same inventor, Gaspar Hernandez, III, filed on the same date, Sep. 29, 1999, that is assigned to the same assignee, Lucent Technologies Inc. The entire contents of this first copending application are hereby incorporated by reference.

One of the commands listed in the first copending application is the "GETSDP" command. Details of this command can be found in a second copending U.S. patent application, U.S. patent application Ser. No. 09/407,878, entitled "Technology to Translate Non-Text Display Generation Data Representing An Indicator Into Text Variables," by the same inventor, Gaspar Hernandez, III, filed on the same date, Sep. 29, 1999, that is assigned to the same assignee, Lucent Technologies Inc. The entire contents of this second copending application are hereby incorporated by reference.

The programmed processor 320 preferably has one or more programs to generate a Script interpreter that will interpret each line in a script. The Interpreter can be executed from a command line or by way of a Graphical User Interface (GUI). The program processor 320 preferably also includes a program to generate a Scriptor by which a user can write a script and/or debug an existing script.

Details of a Scriptor and an Interpreter especially suited to the WAMIL language are contained in a third copending U.S. patent application, U.S. patent application Ser. No. 09/407,885, entitled "Scriptor and Interpreter," filed by the same inventor, Gaspar Hernandez, III, filed on the same date, Sep. 29, 1999, that is assigned to the same assignee, Lucent Technologies Inc. The entire contents of this third copending application are hereby incorporated by reference.

Details of a Graphical User Interface (GUI) to ease the burden on a user represented by command line execution are contained in a fourth copending application, U.S. patent application Ser. No. 09/407,877, entitled "Graphical User Interface (GUI) For Forming Text String For Command Line Execution Burden," by the same inventor, Gaspar Hernandez, III, filed on the same date, Sep. 29, 1999, that is assigned to the same assignee, Lucent Technologies Inc. The entire contents of this fourth copending application are hereby incorporated by reference.

Another example script, namely Script #2, follows. Script #2 uses the SDP interface and the TI interface.

SCRIPT #2

| LINE # | COMMAND |
| --- | --- |
| 01 | WAM:MSC 5 |
| 02 | WAM:CONNECT SDP |
| 03 | IF:LFAIL |
| 04 | THENDO: |
| 05 |    WAM:PRINT SDP OMP login attempt failed, script aborted |
| 06 |    WAM:ENDTEST |
| 07 | ELSEDO: |
| 08 | ENDIF: |
| 09 | IF:SDPPORT |
| 10 | THENDO: |
| 11 |    WAM:PRINT SDP vtty ports not available script aborted |
| 12 |    WAM:ENDTEST |
| 13 | ELSEDO: |
| 14 | ENDIF: |
| 15 | WAM:CELL 49 |
| 16 | WAM:BBAVAR |
| 17 | SDP:2138,49 |
| 18 | WAM:GETSDP BBA |
| 19 | IF:TEST_EXPR SDPVAR_COLOR EQ BLACK_ON_GREEN |
| 20 | THENDO: |
| 21 |    WAM:PRINT BBA BBAVAR is ACTIVE |
| 22 |    WAM:SET WAM 1 |
| 23 | ELSEDO: |
| 24 |    WAM:PRINT:BBA BBAVAR is NOT ACTIVE |
| 25 | ENDIF: |
| 26 | WAM:CONNECT TI |
| 27 | IF:LFAIL |
| 28 | THENDO: |
| 29 |    WAM:PRINT TI login attempt failed, script aborted |
| 30 | WAM:ENDTEST |
| 31 | ELSEDO: |
| 32 | ENDIF: |
| 33 | IF:TEST_EXPT WAM EQ 1 |
| 34 | THENDO: |
| 35 |    TI:dgn:cell 49, bba BBAVAR |
| 36 | ELSEDO: |
| 37 |    TI:rst:cell 49, bba BBAVAR |
| 38 | ENDIF: |
| 39 | WAM:DISCONNECT TI |
| 40 | WAM:DISCONNECT SDP |
| 41 | WAM:ENDTEST |

In line 1 of Script #2, the mobile switching center variable, MSC, is set to the value 5. Line 2 recites the command to connect to the SDP interface. Lines 3–8 correspond to an if-construct for dealing with a first kind of possible failure to establish an SDP interface session. Lines 9–14 present another if-construct to deal with a second kind of failure to establish an SDP interface session could not be established.

Line 15 of Script #2 sets the cell variable, CELL, to the value 49. Line 16 recites the BBVAR command, which indicates that the value for the variable BBA will be supplied by the user to the script, as an argument appended to the command line.

Line 17 of Script #2 is a command for the SDP interface to return an arrangement of screen indicators identified by screen #2138, for the cell 49. Line 18 recites the GETSDP command to convert the nontext attributes of an indicator corresponding to the value of the variable VBA into text variables. Again, the GETSDP command is explained in detail in the second copending application that has been incorporated by reference, as discussed above.

Lines 19–25 of Script #2 represent an if-construct for testing the condition of whether the indicator is in a particular state. If so, i.e., if the condition is satisfied, then the commands in lines 21 and 22 are to be interpreted. If not, i.e., if the condition is not satisfied, then the command in line 24 is to be interpreted.

Line 26 of Script #2 recites the command to establish a second interface session, namely a TI interface session. Lines 27–32 account for the possibility that the TI interface session can not be established.

Lines 33–38 of Script #2 represent an if-construct for deciding whether to perform diagnostics on a cell BBA (line 35) (which takes the cell out of service for the duration of the diagnostics) or restore the cell BBA (line 37) depending upon the value of the general WAMIL variable, WAM, that is tested in line 33. It is noted that the value of the WAMIL variable, WAM, corresponds to the state of the indicator, as determined in lines 21–22. The default value for the WAIL variable WAM is zero. Hence, no WAM:SET WAM 0 command is included after line 24, whereas it is necessary in line 22 because it is changing the default value.

Line 39 of Script #2 terminates the TI interface session. Line 40 terminates the SDP interface session. Line 41 terminates execution of Script #2.

A third example of a script follows. Script #3 emphasizes flow control using the "IF:OMSG" statement as the basis of a second form of an if-construct. In light of the detailed discussion of WAMIL commands and if-construct elements available in the second copending application that has been incorporated by reference, as well as the previous discussion, Script #3 is considered to be self-explanatory.

SCRIPT #3

LINE # COMMAND

```
01    WAM:MSC 5
02    WAM:CELL 49
03    WAM:CCC 4
04    WAM:CONNECT TI
05    TI:rst:cell 49, ccc 4
06    TI:op:cell 49
07    IF:OMSG OP:CELL CELLVAR CCC CCCVAR, ACTIVE
08    THENDO:
09       WAM:PRINT CCC CCCVAR is active script will continue
10    ELSEDO:
11       IF:OMSG OP:CELL CELLVAR CCC CCVAR, ACTIVE
12       THEN:CONTINUE
```

-continued

SCRIPT #3

LINE # COMMAND

```
13       ELSE:WAITQUERY 5 TI 10
14       IF:OMSG OP:CELL CELLVAR CCC CCCVAR, ACTIVE
15       THENDO:
16       ELSEDO:
17          WAM:PRINT CCC CCVAR never became active
18          WAM:ENDTEST
19       ENDIF:
20    ENDIF:
21    TI:dgn:cell 49, ccc 4
22    IF:OMSG COMPLETED
23    THEN:CONTINUE
24    ELSE:WAITQUERY 5 TI 10
25    WAM:DISCONNECT TI
26    WAM:ENDTEST
```

A fourth example script follows, namely Script #4. Script #4 emphasizes the WAM:WMMI suite of commands and its related commands. For similar reasons as those presented in the discussion of Script #3, Script #4 is considered to be self-explanatory.

SCRIPT #4

LINE # COMMAND

```
01    WAM:WAMLIST please Enter Paging Rate
02    WAM:WMMIO TESTEND WAMVAR 1
      HOME This is Our Message
03    WAM:WAIT 20
04    WAM:WMMI_GETCOUNT WAMVAR
05    IF:TEST_EXPR WAMVAR GT 3
06    THENDO:
07       WAM:PRINT Paging rate is WAMVAR, too fast! Reduce to
         default 1200 per hour.
08       WAM:WMMI_SEND CHANGERATE 1200
09       WAM:WAIT 10
10       WAM:WMMI_GET COUNT WAMVAR
11       IF:TEST_EXPR WAMVAR LT 20
12       THENDO:
13          WAM:PRINT Paging rate is good now!
14       ELSEDO:
15          WAM:PRINT Paging rate still too fast! Script aborted!
16          WAM:WMMI_STOP
17          WAM:ENDTEST
18       ENDIF:
19    ELSEDO:
20       WAM:PRINT Paging rate is not bad!
21    ENDIF:
22    WAM:WMMI_SEND SENDPAT Send this message only once!
23    WAM:WAIT 5
24    WAM:WMMI_SEND CHANGERPAT
      This is our new message.
25    WAM:WAIT 10
26    WAM:WMMI_STOP
```

The invention has been described, for convenience, in terms of the TI interface, the SDP interface and/or the APXRCV interface to the Background Art monitoring system. However, the liaison interface according to the invention is applicable to other user interfaces such as those found in the air traffic control arts, train and subway control arts, chemical processing plant control arts, power generation plant control arts, etc. Again, common characteristics of these interfaces include (1) that they hold the user captive by requiring a great deal of direct user interaction and (2) that they are mature products for which research and development efforts have been greatly diminished, making substantive redesigns, e.g., software rewrites, (to obtain more user-friendly output) prohibitively expensive. Thus, the invention does not disturb the existing monitoring system and yet achieves a desired goal of greatly reducing the amount of direct interaction between the user a user-interface without redesigning the software of the dedicated non-text-variable-output systems.

The invention may be embodied in other forms without departing from its spirit and essential characteristics. The described embodiments are to be considered only non-limiting examples of the invention. The scope of the invention is to be measured by the appended claims. All changes which come within the meaning and equivalency of the claims are to be embraced within their scope.

What is claimed is:

1. An arrangement of interfaces to a system, the arrangement of interfaces comprising:

a first interface to said system, said first interface requiring direct user decision-making interaction associated with exchanging a first amount of information between said user and said system; and a second interface to said first interface, said second interface requiring some direct user decision-making interaction albeit a lesser amount of direct user decision-making interaction than said first interface, said decision-making interaction being associated with exchanging said first amount of information between said user and said system, said second interface communicating with said user in a different manner than said first interface, and said second interface reducing an extent to which the user is required to directly interact with said first interface.

2. The arrangement of interfaces of claim 1, further comprising:

a third interface to said system, said third interface similarly requiring direct user decision-making interaction associated with exchanging said first amount of information between said user and said system;

said second interface similarly requiring some direct user decision-making interaction albeit a lesser amount of direct user decision-making interaction than said third interface, said decision-making interaction being associated with exchanging said first amount of information between said user and said system, said second interface communicating with said user in a different manner than said third interface, and said second interface reducing an extent to which the user is required to directly interact with said third interface.

3. The arrangement of interfaces of claim 1, wherein said system is a wireless communication network and said first interface is one of the TIpdunix (TI) interface, the Status Display Page (SDP) interface and the AUTOPLEX Recent Change & Verification Database (APXRCV) interface.

4. The arrangement of interfaces of claim 3, wherein said system comprises a third interface, said first interface is said TI Interface and said third interface is one of said SDP interface and said APXRCV interface.

5. The arrangement of interfaces of claim 1, wherein said second interface is the Wireless Automation Manager (WAM).

6. A computer-readable medium having embodied thereon a script for processing by a machine directly connected to a system, said system having a first interface that requires direct user decision-making interaction in order for the user to produce a desired result from said system, said computer-readable-medium-embodied script causing said machine to generate a second interface to said system, said second interface requiring some direct user decision-making interaction albeit a lesser amount of direct user decision-making interaction than said first interface to produce said desired result from said system, said computer-readable-medium-embodied script comprising:

a first code segment to receive a request for said desired result from said user;

a second code segment to communicate with said first interface of said system to achieve said desired result from said system; and a third code segment to communicate said result to said user;

the communication between said user and said first and third code segments representing less direct user decision-making interaction than would be required if said user were to directly interact with said first interface to produce said desired result.

7. The computer-readable-medium-embodied script of claim 6, wherein said system is a wireless communication network and said first interface is one of the TIpdunix (TI) interface, the Status Display Page (SDP) interface and the AUTOPLEX Recent Change & Verification Database (APXRCV) interface.

8. The computer-readable-medium-embodied script of claim 6, wherein said second interface is the Wireless Automation Manager (WAM).

9. For a machine directly connected to a system, said system having a first interface that requires direct user decision-making interaction in order for the user to produce a desired result from said system, a method to generate a second interface to said system, said second interface requiring some direct user decision-making interaction albeit a lesser amount of direct user decision-making interaction than said first interface to produce said desired result from said system, said method comprising:

generating said second interface to receive a request for said desired result from said user;

communicating between said second interface and said first interface to achieve said desired result from said system; and causing said second interface to communicate said desired result to said user;

the communication between said second interface and said user representing less direct user decision-making interaction than would be required if said user were to directly interact with said first interface to produce said desired result.

10. The method of claim 9, wherein said system is a wireless communication network and said first interface is one of the TIpdunix (TI) interface, the Status Display Page (SDP) interface and the AUTOPLEX Recent Change & Verification Database (APXRCV) interface.

11. The method of claim 9, wherein said second interface is the Wireless Automation Manager (WAM).

12. An integration apparatus to integrate interfaces to a system, said system having at least a first interface and a second interface, said first and second interfaces not being integrated together, said first interface requiring a larger amount of direct user decision-making interaction than said second interface, said apparatus comprising:

a processor, directly connected to said system, to generate said second interface to receive a high level request from said user to produce a result via interaction with said system, communicate with said first interface to achieve said result, and cause said second interface to communicate a second amount of information with said user representing said result, and a device to present said second interface to said user;

communication between said second interface and said user to achieve said result representing some direct user decision-making interaction albeit a lesser amount of direct user decision-making interaction than would be required if said user were to directly interact with said first interface to produce said result.

13. The apparatus of claim 12, wherein said system is a wireless communication network and said first interface is the TIpdunix (TI) interface and said second interface is one of the Status Display Page (SDP) interface and the AUTOPLEX Recent Change & Verification Database (APXRCV) interface.

14. The apparatus of claim 12, wherein said second interface is the Wireless Automation Manager (WAM).

* * * * *